United States Patent
Eisele

(10) Patent No.: US 10,966,446 B2
(45) Date of Patent: Apr. 6, 2021

(54) HONEY COMPOSITIONS AND METHODS OF MAKING THE SAME

(71) Applicant: Steven Eisele, Felda, FL (US)

(72) Inventor: Steven Eisele, Felda, FL (US)

(*) Notice: Subject to any disclaimer, the term of this patent is extended or adjusted under 35 U.S.C. 154(b) by 277 days.

(21) Appl. No.: 15/761,907

(22) PCT Filed: Sep. 23, 2016

(86) PCT No.: PCT/US2016/053320
§ 371 (c)(1),
(2) Date: Mar. 21, 2018

(87) PCT Pub. No.: WO2017/053708
PCT Pub. Date: Mar. 30, 2017

(65) Prior Publication Data
US 2018/0279660 A1    Oct. 4, 2018

Related U.S. Application Data

(60) Provisional application No. 62/222,319, filed on Sep. 23, 2015.

(51) Int. Cl.
*A23L 21/25* (2016.01)
*A23L 21/20* (2016.01)
*A23L 29/30* (2016.01)
*A23L 27/10* (2016.01)

(52) U.S. Cl.
CPC ............ *A23L 21/25* (2016.08); *A23L 21/20* (2016.08); *A23L 27/10* (2016.08); *A23L 29/30* (2016.08); *A23V 2002/00* (2013.01)

(58) Field of Classification Search
None
See application file for complete search history.

(56) References Cited

U.S. PATENT DOCUMENTS

| 3,244,528 A | 4/1966 | Torr |
| 4,472,450 A | 9/1984 | Platt, Jr. et al. |
| 2002/0022078 A1 | 2/2002 | Gordon et al. |
| 2011/0206811 A1 | 8/2011 | Sarig et al. |
| 2013/0224337 A1 | 8/2013 | Siegfried |

FOREIGN PATENT DOCUMENTS

DE    19903969 A1 *  7/2000  ............. A61K 26/23

OTHER PUBLICATIONS

Machine translation of DE 19903969, published Jul. 27, 2000. pp. 1-6. (Year: 2000).*
International Search Report and Written Opinion for PCT/US2016/53320, dated Dec. 8, 2016, pp. 1-11.

* cited by examiner

Primary Examiner — Jenna A Watts
(74) Attorney, Agent, or Firm — Dentons Cohen & Grigsby P.C.

(57) ABSTRACT

A process for producing an infused honey composition having a moisture content of 15% to 19% w/w is described. The process generally includes adding an infusing agent to honey to form an infused honey composition. The honey may be dried prior to addition of the infusing agent, after addition of the infusing agent, or both before and after addition of the infusing agent. The infusing agents are generally not-from-concentrate components of a plant including an extract or juice, fruit, seeds, skin, stems, roots, or leaves.

19 Claims, 4 Drawing Sheets

HONEY COMPOSITIONS AND METHODS OF MAKING THE SAME

The present application is a 35 U.S.C. § 371 application of PCT/US2016/053320, filed on Sep. 23, 2016, which claims the benefit under 35 U.S.C. § 119(e) of prior U.S. Provisional Application No. 62/222,319, filed Sep. 23, 2015, the disclosure of each of which is incorporated herein by reference in its entirety.

FIELD OF THE INVENTION

This disclosure generally relates to the field of flavor infused honey. More specifically, the disclosure relates to processes for providing a flavor infused honey and to flavor infused honey compositions having low moisture content.

BACKGROUND OF THE INVENTION

There are many conventional infused honey products available to consumers that comprise honey infused with some type of low moisture concentrate or powder. One example is honey infused with cinnamon powder. By infusing honey with cinnamon powder, the sweetness of the honey expands to include the flavor and spice of cinnamon. Honey infused with cinnamon powder, or with some other powder or concentrate, does not have a significant increase in moisture content. This is important to ensure satisfactory shelf life of the honey and to reduce the likelihood of fermentation, granulation, separation and other consequences that may be associated with higher moisture honey agents. Conventional infusing agents, such as low moisture concentrates or powders, typically have moisture contents that are sufficiently low, or are used in sufficiently small quantities so that the moisture content of the honey is not raised.

The upper moisture content limit for Grade A honey may be about 18.5% by weight in some jurisdictions (i.e., 18.5 g water/100 g total honey composition). Honey having this moisture content is generally capable of suppressing the growth of yeasts and other microbial species. At water contents above about 18% by weight, yeasts can flourish in honey. This can lead to fermentation and loss of product quality. Reducing the water content of honey is not a simple task, however. Conventional methods for dewatering sucrose solutions or maple sugar solutions such as evaporating water by boiling or removing water through semipermeable reverse osmosis membranes have major failings when applied to honey dewatering.

Accordingly, processes for infusing honey with higher quantities of ingredients having higher moisture contents, but which yield low moisture honey compositions, are desirable.

SUMMARY OF THE INVENTION

The presently disclosed invention provides a honey composition generally comprising 50.1% to 99.9% w/w honey and 49.9% to 0.1% w/w infusing agent.

The presently disclosed invention also provides a process for making a honey composition that generally comprises drying liquid honey to an initial moisture content, adding an infusing agent to the dried honey to generate infused honey having an intermediate moisture content, and drying the infused honey to a final moisture content.

The presently disclosed invention further provides a process for making a honey composition that generally comprises drying liquid honey to an initial moisture content, adding an infusing agent to the dried honey to generate infused honey having a final moisture content.

The presently disclosed invention further provides a process for making honey compositions that generally comprises adding an infusing agent to a liquid honey to generate infused honey having an intermediate moisture content, and drying the infused honey to a final moisture content.

BRIEF DESCRIPTION OF THE DRAWINGS

Aspects, features, benefits and advantages of the embodiments herein will be apparent with regard to the following description, appended claims, and accompanying drawings. In the following figures, like numerals represent like features in the various views.

DETAILED DESCRIPTION OF THE INVENTION

Figure 1:
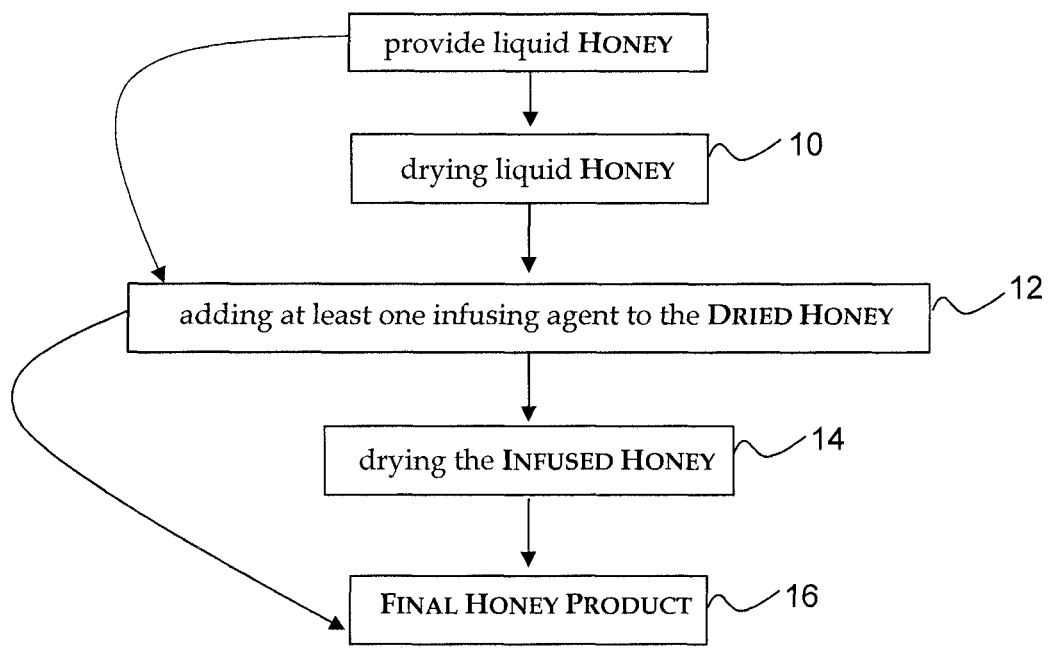
FIG. 1 is a diagram of a process for preparing flavor infused honey according to certain aspects of the present invention.

In the following description, the present invention is set forth in the context of various alternative embodiments and implementations involving a process for making a flavor infused honey composition having a final moisture content of 15% to 19% w/w. The process allows for infusion with high moisture content infusing agents, generally at least 30% w/w, but provides for a final honey composition having relatively low moisture content, generally 15% to 19% w/w, which is similar to Grade A honey. The process thus provides honey compositions with enhanced flavor that may have the shelf life and product stability of a Grade A honey.

All numerical quantities stated herein are approximate, unless indicated otherwise, and are to be understood as being prefaced and modified in all instances by the term "about". The numerical quantities disclosed herein are to be understood as not being strictly limited to the exact numerical values recited. Instead, unless indicated otherwise, each numerical value included in this disclosure is intended to mean both the recited value and a functionally equivalent range surrounding that value.

All numerical ranges recited herein include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value equal to or less than 10.

As generally used herein, the articles "one", "a", "an", and "the" include "at least one" or "one or more" of what is claimed or described, unless indicated otherwise. For example, "a" component means one or more components, and thus, possibly, more than one component is contemplated and may be employed or used in an implementation of the described embodiments.

As generally used herein, the terms "include", "includes", and "including" are meant to be non-limiting.

As generally used herein, the terms "have", "has", and "having" are meant to be non-limiting.

The present disclosure is generally directed to honey compositions and methods of making the same. More specifically, flavor infused honey and processes for infusing honey with higher-moisture infusing agents are described.

As generally used herein, the term "honey" refers to a product prepared by bees from plant nectars, from plant secretions and from excretions of plant sucking insects ("honeydew"). Honey may also be referred to as the nectar and saccharine exudations of plants gathered, modified and stored by the honey bee. The chemical composition of honey varies depending on nectar source, season, and production methods. Storage conditions may also influence final composition, with the proportion of disaccharides increasing over time.

Honey can be used in various foods and beverages as a sweetener and flavoring. Honey has about the same relative sweetness as granulated sugar. Honey may comprise fructose and glucose in relatively equal amounts (approximately 70% w/w). Honey may also comprise lesser amounts of sucrose (approximately 1% w/w), other disaccharides and oligosaccharides. Gluconic acid, other acids and small amounts of proteins, enzymes (including glucose oxidase), amino acids and minerals, such as potassium, may also be present. Honey may be mildly acidic having a pH about 3.9, such as from 3.1 to 6.1. Honey may have a low moisture content (13% to 26% w/w) as well as a low water activity (0.562-0.62). Flavors of honey vary based on the nectar source, and various types and grades of honey are available.

Any liquid honey may be used in the manufacture of the honey product of the present invention. The liquid honey may be raw (e.g., untreated), semi-processed (e.g., strained or filtered honey) or processed (e.g., pasteurized). The honey product may be made with liquid honey originating from any nectar source. Nectar sources include, but are not limited to, Acacia, Alfalfa, Apple, Avocado, Blueberry, Buckwheat, Cabbage Palm, Canola, Clover, Cotton, Cranberry, Dandelion, Eucaluptus, Fireweed, Gallberry, Goldenrod, Grape, Mangrove, Mesquite, Mexican Clover, Milkweed, Orange Blossom, Palmetto, Pepper Tree, Prune, Rape, Raspberry, Sage, Sourwood, Starthistle, Sunflower, Tallow Tree, Tupelo and/or Wildflower.

The liquid honey used to manufacture the honey product of the present invention may be derived from a single nectar source or from a combination of nectar sources depending on the desired properties of the final product.

Liquid honey may be used in the processes of making the infused honey compositions described herein. The moisture content of liquid honey typically ranges from about 13% by weight to about 26% by weight. The starting liquid honey product may be standardized to a fixed initial moisture content, or alternatively, the initial moisture content may be taken into consideration before the addition of the infusing agent. The moisture content prior to infusion may be 5% to 26% by weight, 5% to 20% by weight, 6% to 19% by weight, 7% to 16% by weight, 10% to 19% by weight, 15% to 19% by weight, or 16% to 18.5% by weight. The percent by weight is based on the total weight of the composition, and may also be referred to as % w/w.

There is also a variation in the flavor and aroma contents of honey. Liquid honey may be chosen for specific types of honey components based on what final aroma and flavors are desired in the final honey product. A higher or lower moisture content may be used, adapting the process accordingly. The moisture content after infusion may be 15% to 24% by weight, 17% to 23% by weight, 15% to 19% by weight, or 16% to 18.5% by weight.

The honey composition may comprise 50.1% to 99.9% w/w honey and 49.9% to 0.1% w/w infusing agent, for example 66.5% to 99.9% w/w honey and 32.5% to 0.1% w/w infusing agent, or even 91% to 99.9% w/w honey and 9% to 0.1% w/w infusing agent. The honey composition may comprise 50.1% to 99.9% w/w honey, 49.9% to 0.1% w/w infusing agent, and a balance of incidental impurities. The honey composition may comprise 66.5% to 99.9% w/w honey, 32.5% to 0.1% w/w infusing agent, and a balance of incidental impurities. The honey composition may comprise 91% to 99.9% w/w honey, 9% to 0.1% w/w infusing agent, and a balance of incidental impurities.

The honey composition may comprise of 0.1% to 9% w/w infusing agent when the infusing agent has a moisture content of at least 95% by weight; 0.1% to 32.5% w/w infusing agent when the infusing agent has a moisture content of at least 50% by weight; or 0.1% to 49.9% w/w infusing agent when the infusing agent has a moisture content of at least 30% by weight.

The honey composition may comprise an infusing ratio of 0.1% to 9% w/w infusing agent when the infusing agent has a moisture content of at least 95% by weight; 0.1% to 32.5% w/w infusing agent when the infusing agent has a moisture content of at least 50% by weight; or 0.1% to 49.9% w/w infusing agent when the infusing agent has a moisture content of at least 30% by weight.

The honey composition may comprise an infusing ratio which defines an amount of the infusing agent to add to the infused honey composition. A table of exemplary amounts is shown in Table 1. The infusing agent is reported in Table 1 as grams of the infusing agent (at left) added per pound of honey (1 lb.-454 grams), where the initial ("starting") and final ("resulting") moisture contents (w/w) are reported for a range of added amounts of the infusing agent. Note that the moisture content of the infusing agent in this example is 97% w/w.

TABLE 1

| Infusing Agent | Starting $H_2O$: | | | | | |
|---|---|---|---|---|---|---|
| (+/− 97% $H_2O$) | 16.0% | 16.5% | 17.0% | 17.5% | 18.0% | 18.5% |
| | Resulting $H_2O$: | | | | | |
| 10 | 17.8% | 18.3% | 18.8% | 19.3% | 19.7% | 20.2% |
| 15 | 18.7% | 19.2% | 19.6% | 20.1% | 20.6% | 21.1% |
| 20 | 19.6% | 20.0% | 20.5% | 21.0% | 21.5% | 22.0% |
| 25 | 20.5% | 20.9% | 21.4% | 21.9% | 22.4% | 22.8% |
| 30 | 21.4% | 21.8% | 22.3% | 22.8% | 23.2% | 23.7% |

A process to prepare an infused honey may generally comprise dehydrating honey prior to infusion, instead of dehydrating the infusing agent, to offset the effects of infusion with, for example, fresh pressed not-from-concentrate juice (e.g., pepper juice, grape juice, citrus juice). The process may comprise drying honey naturally or artificially using an open or closed drying process, system, or combination of elements, and applying the drying process prior to honey extraction from the honey comb, post extraction from the honey comb, or a combination thereof. Extraction of honey from honeycomb may use methods known in the art such as, for example, centrifuging the combs or crushing and heating the combs. The honey may be dried at temperatures from −51° C. to 177° C. for a time period effective to achieve the desired moisture content, such as from less than 1 second to 7 days or more.

The process may comprise infusing the honey with sufficient quantities of infusing agents comprising higher moisture ingredients to generate a final product having the desired moisture contents. Blenders, mixers or agitators, for example, may be used for blending the honey with the infusing agents. The term "higher moisture content" ingredients may generally be taken to mean ingredients having a moisture content of at least 18.5% w/w, such as at least 20% w/w, at least 25% w/w, at least 30% w/w, at least 40% w/w, at least 50% w/w, at least 60% w/w, at least 70% w/w, at least 80% w/w, at least 90% w/w, or at least 95% w/w.

The infusing agent may be an extract or juice from a plant, such as from the fruit, seeds, stems, roots, skin, or any other usable part, and/or may comprise portions of, or all of, a plant, such as from the fruit, seeds, stems, roots, skin, wherein the infusing agent comprises a higher moisture content as defined above.

The infusing agent may comprise a bland, sweet, sour, bitter, salty, spicy, pungent, umami, or metallic flavor. The flavor may comprise natural flavor, artificial flavor, fruit flavor, vegetable flavor, meat flavor, seafood flavor, and other flavor. The infusing agent may be in the form of a solid or liquid with the proviso that the infusing agent does not lack water (e.g., has a higher moisture content as defined above). The infusing agent may comprise skin, skinned, unskinned, unshelled, cut, uncut, extract, juice, sauce, oil, gel, jelly, wax, cream, paste, small particles, or small pieces. The infusing agent may be uncooked or cooked.

The infusing agent may comprise a pepper from the genus *Capsicum*, such as, for example, Banana pepper, Bell pepper, Cayenne pepper, Chili pepper, Habanero, Jalapeno, Serrano, or any other suitable hot pepper, either from the plant, the fruit or the seeds. The infusing agent may comprise citrus from the genus *Citrus*, such as, for example, Bitter Orange, Citron, Grapefruit, Kumquat, Lemon, Lime, Mandarin Orange, Papeda, Pomelo, Rangpur, Sweet Orange, Tangerine or any other suitable citrus, either from the plant, the fruit, the seeds or the skin. The infusing agent may comprise grapes from the genus *Vitus*, such as, for example, Cabernet Sauvignon, Catawba, Concord, Merlot, Muscadine, Niagara, Pinot noir, or any other suitable grape, either from the plant, the fruit, the seeds or the skin. The infusing agent may comprise other genus such as, but not limited to, for example, genus *Vaccinium* (Blueberry, Cranberry, Lingonberry) or genus *Euterpe* (Acai), genus *Punica* (Pomegranate), or any other suitable genus.

The infusing agent may have a moisture content of at least 18.5% w/w, such as at least 20% w/w, at least 25% w/w, at least 30% w/w, at least 40% w/w, at least 50% w/w, at least 60% w/w, at least 70% w/w, at least 80% w/w, at least 90% w/w, at least 95% w/w, at least 96% w/w, at least 97% w/w, at least 98% w/w, at least 99% w/w, or at least 99.9% w/w.

The infusing agent may have a moisture content of at least 18.5% w/w, but less than 99.9% w/w, such as 18.5% to 99.9% w/w, 20% to 99.9% w/w, 25% to 99.9% w/w, 30% to 99.9% w/w, 40% to 99.9% w/w, 50% to 99.9% w/w, 60% to 99.9% w/w, 70% to 99.9% w/w, 80% to 99.9% w/w, 90% to 99.9% w/w, 95% to 99.9% w/w.

The infusing agent may have a moisture content of 18.5% to 30% w/w, 18.5% to 40% w/w, 18.5% to 50% w/w, 18.5% to 60% w/w, 18.5% to 70% w/w, 18.5% to 80% w/w, 18.5% to 90% w/w, or 18.5% to 95% w/w. The infusing agent may have a moisture content of 30% to 40% w/w, 30% to 50% w/w, 30% to 60% w/w, 30% to 70% w/w, 30% to 80% w/w, 30% to 90% w/w, or 30% to 95% w/w.

Table 2 shows the amount of water (in grams) found in honey per pound (454 grams) at normally occurring retail moisture content ranges (% listed as w/w). The first step in the process of the present invention is to ascertain the moisture content percentage of the honey to be used as the starting material. A refractometer or other device may be used to accomplish this. Next, the quantity of infusing agent to be used may be determined, and the resulting increase in moisture content to be expected, as reflected in Tables 1 and 3, may be identified.

TABLE 2

| 1 Lb honey (454 g) | | | | | |
|---|---|---|---|---|---|
| 16.0% | 16.5% | 17.0% | 17.5% | 18.0% | 18.5% |
| Grams $H_2O$ 72.64 | 74.91 | 77.18 | 79.45 | 81.72 | 83.99 |

TABLE 3

| Infusing Agent Grams | Honey $H_2O$ Percent Increase |
|---|---|
| 10 | 1.8% |
| 15 | 2.7% |
| 20 | 3.6% |
| 25 | 4.5% |
| 30 | 5.4% |

Table 3 lists the net increase in water percent of the honey when infused directly with a higher moisture content infusing agent. For example, the first row of Table 3 indicates that when 10 grams of an infusing agent having a moisture content of 97% by weight is added to one pound of honey, the resulting infused honey composition may have a final moisture content that is 1.8% w/w higher. Referring back to Table 1, if the starting honey had a moisture content of 16% w/w, we would then expect this addition to lead to a final moisture content of 17.8% w/w.

TABLE 4

| Infusing Agent | Desired $H_2O$: | | | | | |
|---|---|---|---|---|---|---|
| Grams | 16.0% | 16.5% | 17.0% | 17.5% | 18.0% | 18.5% |
| | Starting $H_2O$ Required: | | | | | |
| 10 | 14.2% | 14.7% | 15.2% | 15.7% | 16.2% | 16.7% |
| 15 | 13.3% | 13.8% | 14.3% | 14.8% | 15.3% | 15.8% |
| 20 | 12.4% | 12.9% | 13.4% | 13.9% | 14.4% | 14.9% |
| 25 | 11.5% | 12.0% | 12.5% | 13.0% | 13.5% | 14.0% |
| 30 | 10.6% | 11.1% | 11.6% | 12.1% | 12.6% | 13.1% |

Referring now to Table 4, the desired final moisture content may be determined, and the respective level to which honey may be dried prior to infusion identified. The honey may then be dried until it reaches the level identified in Table 4.

Honey may be dried prior to extraction from the honeycomb in an open arid environment, or in a closed environment naturally or with the aid of mechanical equipment such as circulating fans and dehumidifiers. If the honey is dried prior to extraction from the comb, the honey may be heated to reduce its viscosity prior to removal from the comb, and the honey may be extracted from the comb using an extraction process prior to infusion. If honey is not sufficiently dry, a combination of pre-extraction and post-extraction drying may be used to achieve the desired dried honey moisture content identified in Table 4.

Honey may also be dried post-extraction using commercially available honey or food driers. Once the honey has been dried to a moisture content as identified in Table 4, it may be infused with higher moisture infusing agents, which may include fresh, not-from-concentrate juices, or other extracts or plant parts as indicated herein.

Referring to FIGS. 1 through 4, a process of infusing honey may generally comprise providing (8) liquid honey having an initial moisture content (20) and drying the liquid honey (10) to provide a dried honey having a first intermediate moisture content (22). At least one infusing agent may be added (12) to the dried honey having the first intermediate moisture content (22) to provide an infused honey having a second intermediate moisture content (24). The infused honey (24) may then be dried (14) to provide a final honey product having a final moisture content (16).

Figure 2:
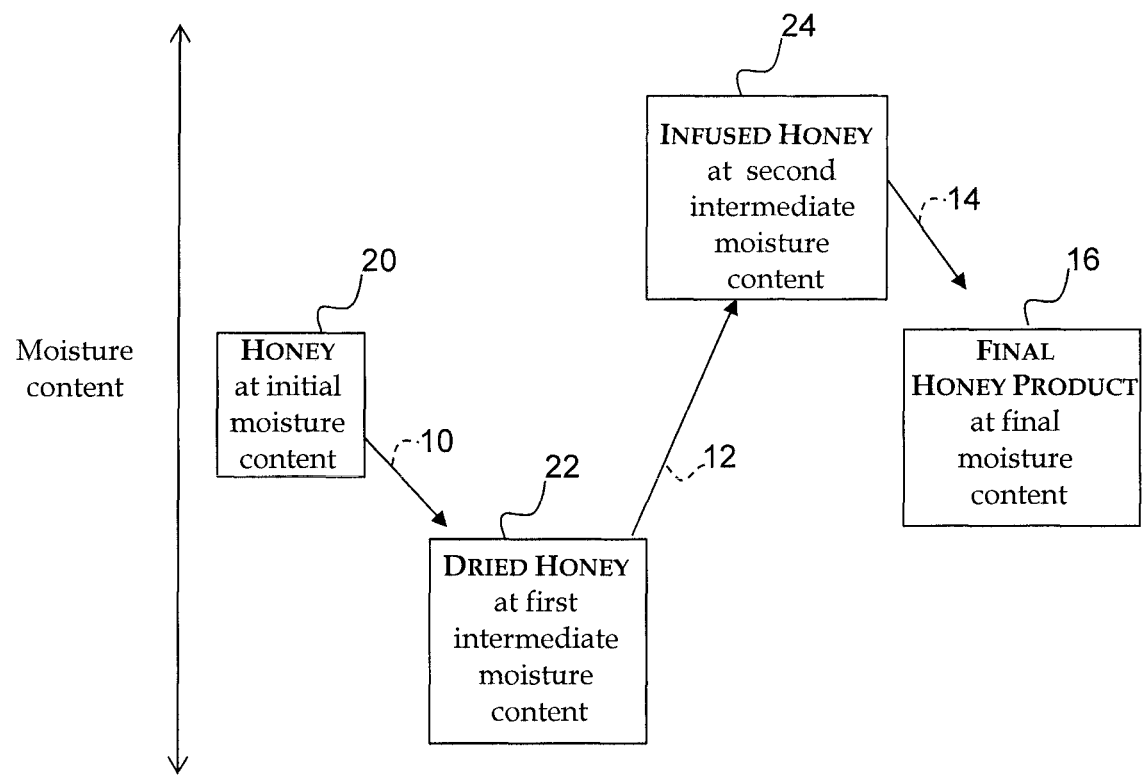
FIG. 2 is a diagram of the changing degree of hydration of the honey during a process for preparing the flavor infused honey according to certain aspects of the present invention.

As shown in FIG. 2, the liquid honey (20) used as the starting material generally has an initial moisture content that may be substantially equal to the final moisture content. The first intermediate moisture content may be less than the initial moisture content and/or final moisture content. Further, the second intermediate moisture content may be greater than the initial, first intermediate, and/or final moisture content.

Figure 3:
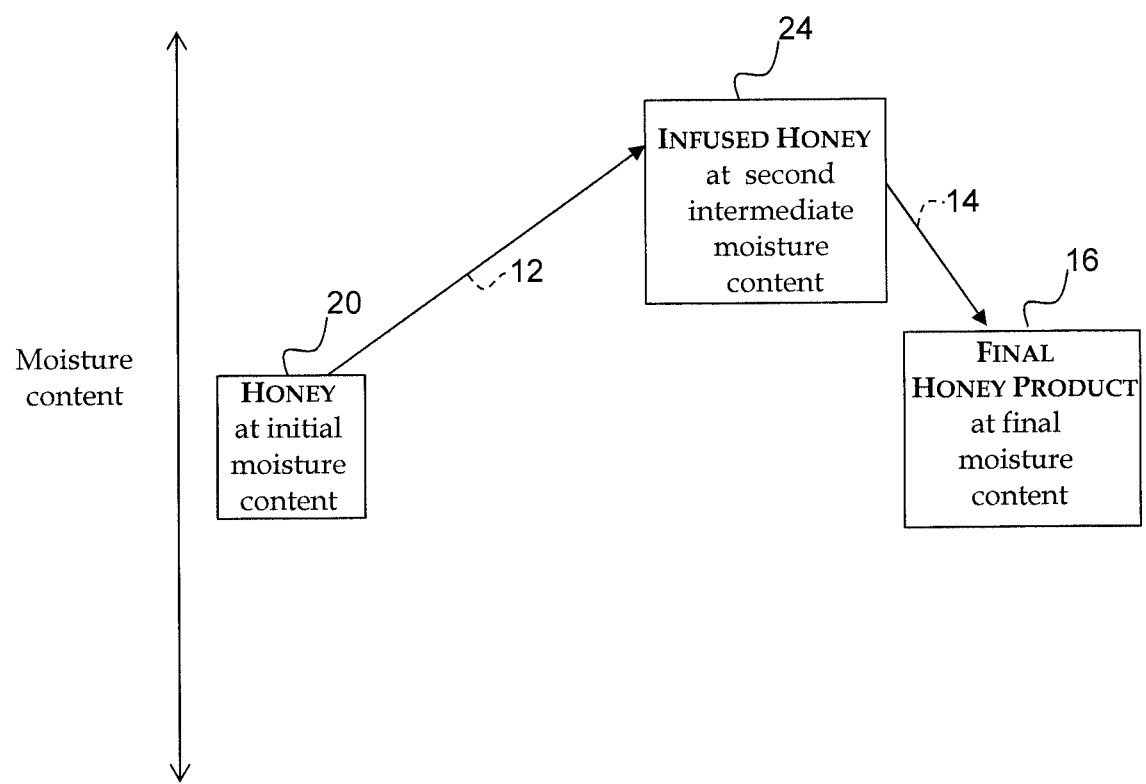
FIG. 3 is a diagram of the changing degree of hydration of the honey during a process for preparing the flavor infused honey according to certain aspects of the present invention.

Alternatively, as shown in FIG. 3, the liquid honey (20) may have an initial moisture content that is low enough to provide addition of the infusing agent directly without prior drying of the liquid honey. That is, the liquid honey may have an initial moisture content that is lower than the final moisture content, and/or which is substantially equal to the first intermediate moisture content. In such a case, the liquid honey (20) may not need to be dried, and the infusing agent may be added directly to the liquid honey (i.e., skip step 10 and go directly to step 12) to provide an infused honey having a second intermediate moisture content (24).

With continued reference to FIG. 3, it is also possible that the liquid honey (20) may have a moisture content which is higher than the final moisture content and/or the first intermediate moisture content, and the volume of infusing agent to be added is low enough that prior drying of the liquid honey is not needed. As indicated above, in such a case the liquid honey (20) may not need to be dried, and the infusing agent may be added directly to the liquid honey (i.e., skip step 10 and go directly to step 12) to provide an infused honey having a second intermediate moisture content (24).

Figure 4:
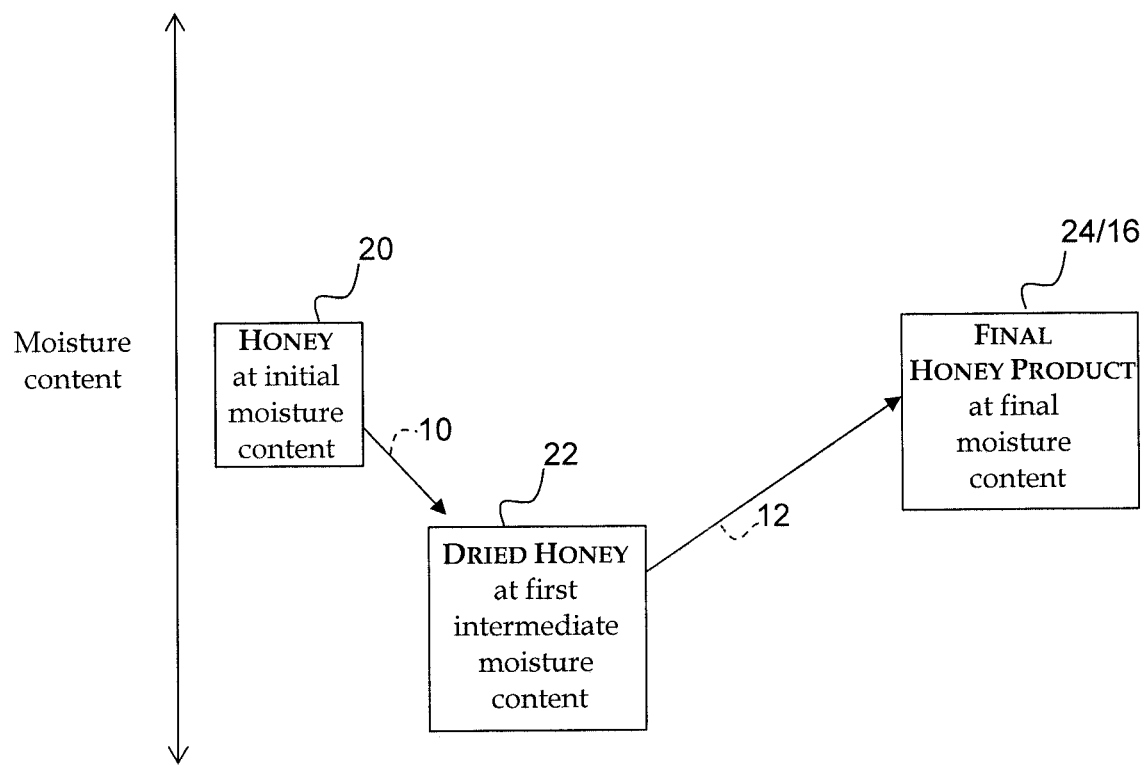
FIG. 4 is a diagram of the changing degree of hydration of the honey during a process for preparing the flavor infused honey according to certain aspects of the present invention.

Referring back to FIGS. 2 and 3, the infused honey (24) may have a second intermediate moisture content that is greater than the initial, first intermediate, and/or final moisture contents. Alternatively, as is shown in FIG. 4, the infused honey (24) may have a second intermediate moisture content that is substantially equal to a final moisture content, such that no additional drying (i.e., skip step 14) may be needed to achieve the final honey product (16).

Thus, the presently disclosed invention provides a process for making a honey composition comprising drying liquid honey having an initial moisture content to provide a dried honey having a first intermediate moisture content, adding an infusing agent to the dried honey to generate an infused honey having a second intermediate moisture content, and drying the infused honey to provide a final honey product having a final moisture content.

The presently disclosed invention also provides a process for making a honey composition comprising drying liquid honey having an initial moisture content to provide a dried honey having a first intermediate moisture content, and adding an infusing agent to the dried honey to generate a final honey product having a final moisture content.

The presently disclosed invention further provides a process for making honey compositions comprising adding an infusing agent to a liquid honey having an initial moisture content to generate an infused honey having a second intermediate moisture content, and drying the infused honey to a provide a final honey product having a final moisture content.

The presently disclosed invention further provides a process for making honey compositions comprising adding an infusing agent to a liquid honey having an initial moisture content to generate a final honey product having a final moisture content.

The honey may have an initial moisture content, a first intermediate moisture content, a second intermediate moisture content, and a final moisture content throughout various stages of the presently disclosed process.

Referring again to FIGS. 2 through 4, the degree of hydration of the liquid honey may be 10% to 19% w/w, such as 15% to 19% w/w, or 16% to 18.5% w/w (i.e., the initial moisture content); the degree of hydration of the dried liquid honey may be 10% to 17% w/w, such as 10% to 16% w/w (i.e., first intermediate moisture content); the degree of hydration of the infused honey may be 15% to 23% w/w, such as 17% to 23% w/w (i.e., second intermediate moisture content); and the degree of hydration of the final honey product may be 15% to 19% w/w, or 16% to 18.5% w/w (i.e., the final moisture content).

According to certain aspects of the process, the first intermediate moisture content may be less than the initial moisture content and final moisture content, and the second intermediate moisture content may be greater than the first intermediate moisture content.

According to certain aspects of the process, a combination of the initial moisture content and the moisture content of the at least one infusing agent generates the final moisture content.

According to certain aspects of the process, the second intermediate moisture content may be substantially the same as the final moisture content.

According to certain aspects of the process, the initial moisture content may be less than the final moisture content.

According to certain aspects of the process, the initial moisture content may be more than the final moisture content.

The processes disclosed herein may be carried out to produce a generally consistent, predictable final honey product in spite of infusing honey with higher moisture infusing agents such as fresh juices rather than the concentrates and/or powders of the prior art.

Each of the characteristics and exemplary embodiments described above, and combinations thereof, may be said to be encompassed by the present invention. The present invention is thus drawn to the following non-limiting aspects:

(1) An infused honey composition comprising 50.1% to 99.9% w/w of a liquid hone, and 49.9% to 0.1% w/w of an infusing agent having a moisture content of at least 18.5% w/w, wherein a final moisture content of the composition is from 15% to 19% w/w.

(2) The infused honey composition according to aspect 1, wherein the final moisture content of the composition is from 16% to 18.5% w/w.

(3) The infused honey composition according to aspects 1 or 2, wherein the moisture content of the infusing agent is at least 30% w/w.

(4) The infused honey composition according to aspects 1 or 2, wherein the moisture content of the infusing agent is at least 50% w/w, and the infused honey composition comprises 0.1% to 32.5% w/w of the infusing agent.

(5) The infused honey composition according to aspects 1 or 2, wherein the moisture content of the infusing agent is at least 95% w/w, and the infused honey composition comprises 0.1% to 9% w/w of the infusing agent.

(6) The infused honey composition according to any of aspects 1 to 5, wherein the infusing agent comprises an extract or a juice from at least one of a plant, a fruit, a seed, a root, a leaf, a skin, or any combination thereof.

(7) The infused honey composition according to any of aspects 1 to 6, wherein the infusing agent comprises portions of, or all of, a plant, a fruit, a seed, a stem, a root, a skin, or combination thereof.

(8) The infused honey composition according to any of aspects 1 to 7, wherein the infusing agent comprises one or more pepper from the genus *Capsicum*, one or more citrus from the genus *Citrus*, one or more grape from the genus *Vitus*, one or more berry from the genus *Vaccinium, Euterpe*, or *Punica*, or any combination thereof.

(9) A process for the production of an infused honey composition, the process comprising: providing a liquid honey having an initial moisture content of 15% to 19% w/w; dehydrating the liquid honey to form a dried honey having an intermediate moisture content of 10% to 17% w/w; adding an infusing agent to the dried honey to form an infused honey composition, wherein the infusing agent has a moisture content of at least 18.5% w/w; and dehydrating the infused honey composition to the final moisture content of 15% to 19% w/w.

(10) The process according to aspect 9, wherein the moisture content of the infusing agent is at least 30% w/w.

(11) The process according to aspects 9 or 10, wherein the infusing agent is added at 0.1% to 49.9% by weight based on the total weight of the composition.

(12) The process according to aspect 9, wherein the moisture content of the infusing agent is at least 50% w/w, and the infusing agent is added at 0.1% to 32.5% by weight based on the total weight of the composition.

(13) The process according to aspect 9, wherein the moisture content of the infusing agent is at least 95% w/w, and the infusing agent is added at 0.1% to 9% by weight based on the total weight of the composition.

(14) The process according to any of aspects 9 to 13, wherein the infusing agent comprises an extract, a juice, a plant, a fruit, a seed, a skin, a root, or a leaf from one or more of a pepper from the genus *Capsicum*, one or more of a citrus from the genus *Citrus*, one or more of a grape from the genus *Vitus*, one or more of a berry from the genus *Vaccinium, Euterpe*, or *Punica*, or any combination thereof.

(15) A process for the production of an infused honey composition, the process comprising: providing a liquid honey having an initial moisture content of 10% to 19% w/w; and adding an infusing agent to form an infused honey composition, wherein the infusing agent has a moisture content of at least 18.5% w/w, wherein the infused honey composition has a final moisture content of 15% to 19% w/w.

(16) The process according to aspect 15, wherein the moisture content of the infusing agent is at least 30% w/w.

(17) The process according to aspects 15 or 16, wherein before adding the infusing agent, the process includes dehydrating the liquid honey having the initial moisture content of 15% to 19% w/w to form a dried honey having an intermediate moisture content of 10% to 17% w/w.

(18) The process according to any of aspects 15 to 17, wherein after adding the infusing agent, the process includes dehydrating the infused honey composition having an intermediate moisture content of 15% to 23% w/w to the final moisture content of 15% to 19% w/w.

(19) The process according to any of aspects 15 to 18, wherein the infusing agent is added at 0.1% to 49.9% by weight based on the total weight of the composition.

(20) The process according to any of aspects 15 to 18, wherein the moisture content of the infusing agent is at least 50% w/w, and the infusing agent is added at 0.1% to 32.5% by weight based on the total weight of the composition.

(21) The process according to any of aspects 15 to 18, wherein the moisture content of the infusing agent is at least 95% w/w of the infusing agent to the liquid honey, and the infusing agent is added at 0.1% to 9% w/w by weight based on the total weight of the composition.

(22) The process according to any of aspects 15 to 21, wherein the infusing agent comprises an extract, a juice, a plant, a fruit, a seed, a skin, a root, or a leaf from one or more of a pepper from the genus *Capsicum*, one or more of a citrus from the genus *Citrus*, one or more of a grape from the genus *Vitus*, one or more of a berry from the genus *Vaccinium, Euterpe*, or *Punica*, or any combination thereof.

(23) An infused honey composition by the process according to any of aspects 9 to 22.

All documents cited herein are incorporated herein by reference, but only to the extent that the incorporated material does not conflict with existing definitions, statements, or other documents set forth herein. To the extent that any meaning or definition of a term in this document conflicts with any meaning or definition of the same term in a document incorporated by reference, the meaning or definition assigned to that term in this document shall govern. The citation of any document is not to be construed as an admission that it is prior art with respect to this application.

While particular embodiments have been illustrated and described, it would be obvious to those skilled in the art that various other changes and modifications can be made without departing from the spirit and scope of the invention. Those skilled in the art will recognize, or be able to ascertain using no more than routine experimentation, numerous equivalents to the specific apparatuses and methods described herein, including alternatives, variants, additions, deletions, modifications and substitutions. This application including the appended claims is therefore intended to cover all such changes and modifications that are within the scope of this application.

What is claimed is:

1. A process for the production of an infused honey composition consisting essentially of a liquid honey and an infusing agent, the process comprising:
   providing the liquid honey having an initial moisture content of 15% to 19% w/w;
   before adding the infusing agent, dehydrating the liquid honey having the initial moisture content of 15% to 19% w/w to form a dried honey having an intermediate moisture content of 10% to 17% w/w; and
   adding the infusing agent to the dried honey having an intermediate moisture content of 10% to 17% w/w to form the infused honey composition, wherein the infusing agent has a moisture content of at least 30% w/w, wherein the infused honey composition has a final moisture content of 15% to 19% w/w.

2. The process of claim 1 comprising, after adding the infusing agent: dehydrating the infused honey composition having an intermediate moisture content of 15% to 23% w/w to the final moisture content of 15% to 19% w/w.

3. The process of claim 1, wherein the infusing agent is added at 0.1% to 49.9% by weight based on the total weight of the composition.

4. The process of claim 1, wherein the moisture content of the infusing agent is at least 50% w/w, and the infusing agent is added at 0.1% to 32.5% by weight based on the total weight of the composition.

5. The process of claim 1, wherein the moisture content of the infusing agent is at least 95% w/w of the infusing agent to the liquid honey, and the infusing agent is added at 0.1% to 9% w/w by weight based on the total weight of the composition.

6. The process of claim 1, wherein the infusing agent comprises an extract, a juice, a plant, a fruit, a seed, a skin, a root, or a leaf from one or more of a pepper from the genus *Capsicum*, one or more of a citrus from the genus *Citrus*, one or more of a grape from the genus *Vitus*, one or more of a berry from the genus *Vaccinium, Euterpe*, or *Punica*, or any combination thereof.

7. The process of claim 1, wherein the infusing agent comprises a not-from-concentrate extract or juice from at least one of a plant, a fruit, a seed, a root, a leaf, a skin, or any combination thereof.

8. The process of claim 1, wherein the infusing agent is other than a concentrate and a powder.

9. The process of claim 1, wherein the infused honey composition comprises an infusing ratio of 0.1% to 9% w/w infusing agent when the infusing agent has a moisture content of at least 95% by weight.

10. The process of claim 1, wherein the infusing agent comprises a not-from-concentrate extract from at least one of a plant, a fruit, a seed, a root, a leaf, a skin, or any combination thereof.

11. The process of claim 1, wherein the infusing agent comprises a not-from-concentrate juice from at least one of a plant, a fruit, a seed, a root, a leaf, a skin, or any combination thereof.

12. The process of claim 1, wherein the infusing agent comprises a not-from-concentrate extract from a fruit.

13. The process of claim 12, wherein the fruit comprises at least one of a citrus from the genus *Citrus*, a grape from the genus *Vitus*, and a berry from the genus of one of *Vaccinium, Euterpe*, and *Punica*.

14. The process of claim 1, wherein the infusing agent comprises a not-from-concentrate extract from a plant.

15. The process of claim 14, wherein the plant comprises a pepper from the genus *Capsicum*.

16. The process of claim 1, wherein the infusing agent comprises a not-from-concentrate juice from a fruit.

17. The process of claim 16, wherein the fruit comprises at least one of a citrus from the genus *Citrus*, a grape from the genus *Vitus*, and a berry from the genus of one of *Vaccinium, Euterpe*, and *Punica*.

18. The process of claim 1, wherein the infusing agent comprises a not-from-concentrate juice from a plant.

19. The process of claim 18, wherein the plant comprises a pepper from the genus *Capsicum*.

* * * * *